(12) United States Patent
Liu et al.

(10) Patent No.: US 11,130,389 B2
(45) Date of Patent: Sep. 28, 2021

(54) COMPRESSOR, AIR CONDITIONING SYSTEM AND VEHICLE

(71) Applicant: GREE GREEN REFRIGERATION TECHNOLOGY CENTER CO., LTD. OF ZHUHAI, Zhuhai (CN)

(72) Inventors: Yun Liu, Zhuhai (CN); Yusheng Hu, Zhuhai (CN); Caixia Shan, Zhuhai (CN); Xiaoli Kang, Zhuhai (CN)

(73) Assignee: GREE GREEN REFRIGERATION TECHNOLOGY CENTER CO., LTD. OF ZHUHAI, Zhuhai (CN)

(*) Notice: Subject to any disclaimer, the term of this patent is extended or adjusted under 35 U.S.C. 154(b) by 323 days.

(21) Appl. No.: 16/338,782

(22) PCT Filed: Jul. 25, 2017

(86) PCT No.: PCT/CN2017/094310
§ 371 (c)(1),
(2) Date: Apr. 2, 2019

(87) PCT Pub. No.: WO2018/076835
PCT Pub. Date: May 3, 2018

(65) Prior Publication Data
US 2021/0260965 A1    Aug. 26, 2021

(30) Foreign Application Priority Data

Oct. 26, 2016  (CN) .......................... 201610949786.0
Feb. 23, 2017  (CN) .......................... 201710100014.4

(51) Int. Cl.
*F25B 1/00*     (2006.01)
*B60H 1/32*     (2006.01)
*B60H 1/00*     (2006.01)

(52) U.S. Cl.
CPC ....... *B60H 1/3223* (2013.01); *B60H 1/00392* (2013.01)

(58) Field of Classification Search
CPC .......................... B60H 1/3223; B60H 1/00392
(Continued)

(56) References Cited

U.S. PATENT DOCUMENTS

| 4,694,660 A | 9/1987 | Gannaway |
| 6,418,747 B1 * | 7/2002 | Mullen ................ B60H 1/3223 62/402 |

(Continued)

FOREIGN PATENT DOCUMENTS

| CN | 1434216 A | 8/2003 |
| CN | 101405547 A | 4/2009 |

(Continued)

OTHER PUBLICATIONS

International Search Report and Written Opinion dated Oct. 27, 2017 in PCT/CN2017/094310 (with English Translation of ISR), citing documents AA, AO-AS therein, 14 pages.

(Continued)

*Primary Examiner* — Davis D Hwu
(74) *Attorney, Agent, or Firm* — Oblon, McClelland, Maier & Neustadt, L.L.P.

(57) ABSTRACT

The present disclosure discloses a compressor, an air conditioning system and a vehicle. The compressor comprises a compression cavity, and further comprises a flash cavity capable of flashing a liquid refrigerant, and a communicating passage that communicates a flash cavity gas outlet of the flash cavity and an enthalpy increasing gas supply port of the compression cavity; the flash cavity is provided with an inlet and a liquid outlet, the inlet of the flash cavity is configured to be communicated with an outlet of a condenser, and the liquid outlet of the flash cavity is configured (Continued)

to be communicated with an inlet of an evaporator. The air conditioning system comprises the compressor, the evaporator, the condenser, a flasher, and various pipelines for connecting the entire system. The compressor comprises the flash cavity with a flash function, so that the entire enthalpy increasing system is simpler, the space for an additional flasher structure is saved, and the enthalpy increasing system is more suitable for a vehicle-mounted air conditioning system with a limited space. The present disclosure also discloses a vehicle, particularly an electric vehicle, using the air conditioning system.

20 Claims, 16 Drawing Sheets

(58) Field of Classification Search
USPC .......................................................... 62/498
See application file for complete search history.

(56) References Cited

U.S. PATENT DOCUMENTS

| | | | |
|---|---|---|---|
| 6,862,892 B1 | 3/2005 | Meyer | |
| 2006/0080977 A1* | 4/2006 | Noda | B60H 1/3208 |
| | | | 62/129 |
| 2012/0067965 A1* | 3/2012 | Rajasekaran | B64F 1/364 |
| | | | 236/44 C |
| 2012/0167601 A1* | 7/2012 | Cogswell | F25B 1/10 |
| | | | 62/115 |

FOREIGN PATENT DOCUMENTS

| | | |
|---|---|---|
| CN | 104197578 A | 12/2014 |
| CN | 106762630 A | 5/2017 |
| CN | 206141269 U | 5/2017 |
| CN | 206487618 U | 9/2017 |
| JP | 5573764 B2 | 7/2014 |
| JP | 2015-151876 A | 8/2015 |
| JP | 2016-148297 A | 8/2016 |

OTHER PUBLICATIONS

Combined Chinese Office Action and Search Report dated Jun. 14, 2018 in corresponding Chinese Patent Application No. 201710100014.4 (with English Translation of Category of Cited Documents) citing documents AQ, AT-AW therein, 6 pages.

Extended European Search Report dated May 26, 2020 in corresponding European Patent Application No. 17863739.3, citing document AA therein, 6 pages.

Communication pursuant to Rules 70(2) and 70a(2) EPC dated Jun. 15, 2020 in corresponding European Patent Application No. 17863739. 3; 1 page.

* cited by examiner

COMPRESSOR, AIR CONDITIONING SYSTEM AND VEHICLE

FIELD OF THE DISCLOSURE

The present disclosure relates to the technical field of air conditioners, in particular to a compressor, an air conditioning system and a vehicle.

BACKGROUND OF THE DISCLOSURE

As new energy vehicles, electric vehicles have the advantages of energy conservation and environmental protection. As an energy-consuming component, the vehicle-mounted air conditioning system therein should achieve rapid cooling and heating and maintain low power consumption. Therefore, the air conditioning system of the electric vehicle requires higher energy efficiency and higher refrigerating and heating capacity of a compressor. Especially in cold winter, when the external ambient temperature is less than −10° C., the output efficiency of the battery is low. In this case, the vehicle-mounted air conditioner needs to achieve rapid heating and maintain high energy efficiency at such a harsh ambient temperature, which imposes higher requirements on the energy efficiency and application environment of the vehicle-mounted compressor.

The conventional compressor hardly meets the requirement for ultra-low temperature rapid heating, so an enthalpy increasing technology is needed. For example, scroll compressors with the characteristics of energy conservation, low noise and high reliability have been widely used as the latest-generation vehicle-mounted compressors. However, the conventional scroll compressors hardly meet the requirement for ultra-low temperature rapid heating. At present, the enthalpy increasing technology is used in the industry to solve the problem of ultra-low temperature rapid heating of the scroll compressors. Compared with the conventional air conditioning system, the air conditioning system with an enthalpy increasing system is more complex. For example, the air conditioning system with an enthalpy increasing system and a scroll compressor requires an additional intermediate cooling structure, i.e., a flash device, with more pipeline and space requirements, where its structure is shown in FIG. 1. Excessive pipeline arrangements in the air conditioning system challenge the endurance of the electric vehicle and the reliability of the system itself.

The enthalpy increasing air conditioning systems are mature and have been widely used in household and commercial air conditioning systems, but are still rarely used in the existing vehicle-mounted air conditioning systems. The main reason is that the existing enthalpy increasing systems themselves are more complicated, and the vehicle-mounted systems need to be as light as possible. Secondly, non-electric vehicles can be heated using the heat of vehicle engines, which alleviates the need for the heating capacity of the air conditioning systems, while electric vehicles cannot use the heat of engines and are completely supplied with heat by the air conditioning systems. Therefore, an enthalpy increasing system with intermediate cooling and gas supplying functions for the compressor is urgently required for the electric vehicle.

SUMMARY OF THE DISCLOSURE

In view of this, the present disclosure provides a compressor, an air conditioning system, and a vehicle, wherein the integrated design of a compressor and a flash device simplifies the air conditioning system and improves the reliability of the system.

A first aspect of the present disclosure provides a compressor comprising:
a compression cavity having an enthalpy increasing gas supply port;
a flash cavity capable for flashing a liquid refrigerant, having a flash cavity inlet for communicating with an outlet of a condenser, a flash cavity gas outlet, and a flash cavity liquid outlet for communicating with an inlet of an evaporator; and
a communicating passage communicating with the flash cavity gas outlet of the flash cavity and the enthalpy increasing gas supply port of the compression cavity.

Preferably, the flash cavity is adjacent to the compression cavity, and the flash cavity and the compression cavity are separated by a common side wall.

Preferably, the communicating passage is arranged on the common side wall.

Preferably, a through hole being the communicating passage is provided on the common side wall to directly communicate the flash cavity and the compression cavity.

Preferably, the outer wall of the body of the compressor forms a part of the wall of the flash cavity.

Preferably, the compressor has an aluminum alloy body.

Preferably, the compressor is an electric compressor, and the flash cavity and a drive motor of the compressor are arranged on two sides of the compression cavity respectively.

Preferably, the compressor is a scroll compressor having a body, and the body is provided with an inflow port, the compression cavity, a discharge port and the flash cavity; the inflow port, the discharge port and the flash cavity communicate with the compression cavity; wherein the compression cavity is configured to compress a first fluid entering via the inflow port; and the flash cavity is configured produce a second fluid by flashing and deliver the second fluid to the compression cavity for compression.

Preferably, the body comprises a static scroll plate, a dynamic scroll plate and a shell, the static scroll plate is provided with a first end plate and a first spiral scroll extending outward from the first end plate, and the dynamic scroll plate is provided with a second end plate and a second spiral scroll extending outward from the second end plate; the first spiral scroll and the second spiral scroll are matched, and when the dynamic scroll plate rotates relative to the static scroll plate, a plurality of mobile cavities being the compression cavity are defined between the first spiral scroll and the second spiral scroll; the static scroll plate and the dynamic scroll plate are arranged inside the shell, and the flash cavity is arranged on at least one of the shell and the static scroll plate.

Preferably, the shell comprises a first cover and a second cover that are detachably connected, the first cover is located on a side of the static scroll plate where the first spiral scroll is not arranged, and the flash cavity is arranged on the first cover.

Preferably, the shell comprises a first cover, a second cover and a sealing cover plate that are detachably connected, the first cover is located on a side of the static scroll plate where the first spiral scroll is not arranged, and the sealing cover plate is arranged on a side of the first cover away from the second cover;
a part of the flash cavity is arranged on the first cover, and the other part of the flash cavity is arranged on the sealing cover plate; or, the flash cavity is arranged on the first cover and has an opening, and the sealing cover plate closes the opening of the flash cavity.

Preferably, a gas-liquid separation structure inclined with respect to the flow direction of the second fluid is arranged in the flash cavity to separate the liquid entrained in the second fluid.

Preferably, the gas-liquid separation structure comprises baffle, and the extending direction of the baffle is at an obtuse or right angle to the flow direction of the second fluid.

Preferably, the gas-liquid separation structure comprises at least two baffles, and the two baffles are arranged in a splayed shape.

Preferably, the gas-liquid separation structure comprises two groups of baffles staggered to form a split-flow passage.

Preferably, the communicating passage is arranged in the first end plate of the static scroll plate, and the flash cavity is communicated with the compression cavity by the communicating passage.

Preferably, the communicating passage comprises an axial passage and a radial passage that communicate with each other, one end of the axial passage away from the radial passage communicates with the flash cavity, and one end of the radial passage away from the axial passage communicates with the compression cavity.

Preferably, the communicating passage extends in the axial direction of the scroll compressor.

Preferably, the compression cavity is provided with an axial through hole communicating with the flash cavity to form the enthalpy increasing gas supply port.

Preferably, a first opening of the flash cavity being the flash cavity inlet is arranged at the top end of the flash cavity to introduce a fluid to be flashed, a second opening of the flash cavity being the flash cavity liquid outlet is arranged at the bottom end of the flash cavity for discharge the liquid that is not flashed, and a third opening of the flash cavity being the flash cavity gas outlet is arranged at the top end of the flash cavity to discharge the flashed second fluid; and the third opening of the flash cavity communicates with the compression cavity.

A second aspect of the present disclosure provides an air conditioning system, comprising a compressor according to any item of the first aspect of the present disclosure, a condenser and an evaporator, the flash cavity inlet communicating to the outlet of the condenser, and the flash cavity liquid outlet communicating to the inlet of the evaporator.

Preferably, the air conditioning system further comprises a fluid supply component in communication with the flash cavity, and the flash cavity is configured to flash a fluid supplied by the fluid supply component to produce a second fluid.

A third aspect of the present disclosure provides a vehicle, comprising an air conditioning system according to any item of the second aspect of the present disclosure.

Preferably, the vehicle is a new energy vehicle.

Preferably, the vehicle is an electric vehicle.

Based on the above technical solutions, the compressor, the air conditioning system and the vehicle provided by the present disclosure have the advantages that the flasher structure is arranged on the compressor body, so that the air conditioning system is simpler and more compact; the gas supply enthalpy increasing pipelines between the flasher and the compressor are reduced, the intermediate cooled gas flashed can quickly enter the compression cavity, and the pressure loss in the intermediate pipeline and the temperature rise in the pipelines are reduced; and the integrated design of the flasher structure and the compressor increases the vibration resistance of the flash structure, so that the flash structure is more suitable for the vehicle-mounted air conditioning system, and the reliability of the enthalpy increasing system is improved. The integrated scroll compressor provided by the above technical solution integrates the functions of compression, flashing and enthalpy increase by gas replenishment, and has the advantages of simple flash structure, fast gas supply and the like.

BRIEF DESCRIPTION OF THE DRAWINGS

In order to describe the technical solutions in the embodiments of the present disclosure or in the prior art more clearly, the accompanying drawings required for describing the embodiments or the prior art are briefly introduced below. Apparently, the accompanying drawings in the following description show only some embodiments of the present disclosure, and a person of ordinary skill in the art may still derive other drawings from these accompanying drawings without creative efforts.

Figure 1:
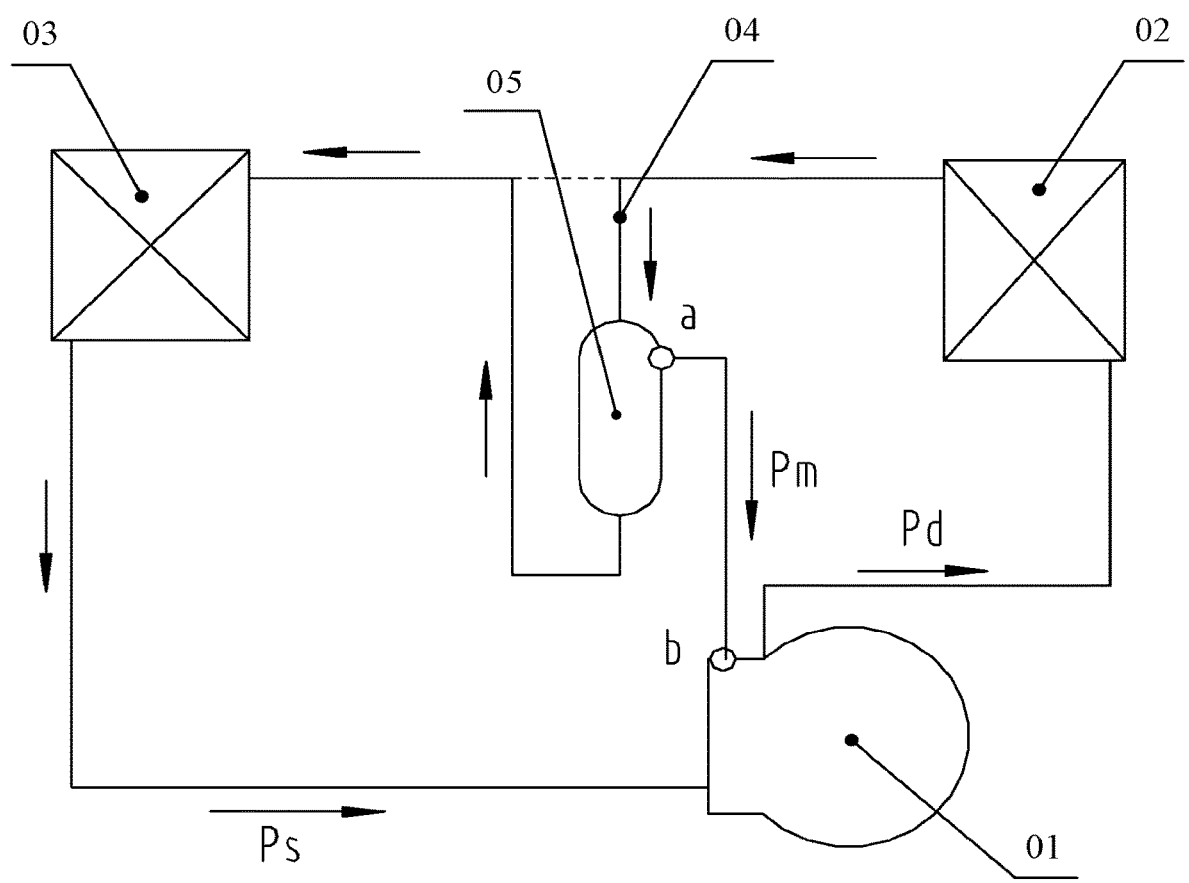
FIG. 1 is a block structure diagram of an enthalpy increasing air conditioning system in the prior art.

REFERENCE SIGNS IN THE PRIOR ART OF FIG. 1 REPRESENT 01, compressor; 02, condenser; 03, evaporator; 04, system pipeline; 05, flasher; Ps, suction side refrigerant; Pd, exhaust side refrigerant; a, flasher gas outlet; b, enthalpy increasing gas supply port; Pm, flash intermediate pressure.

Figure 2:
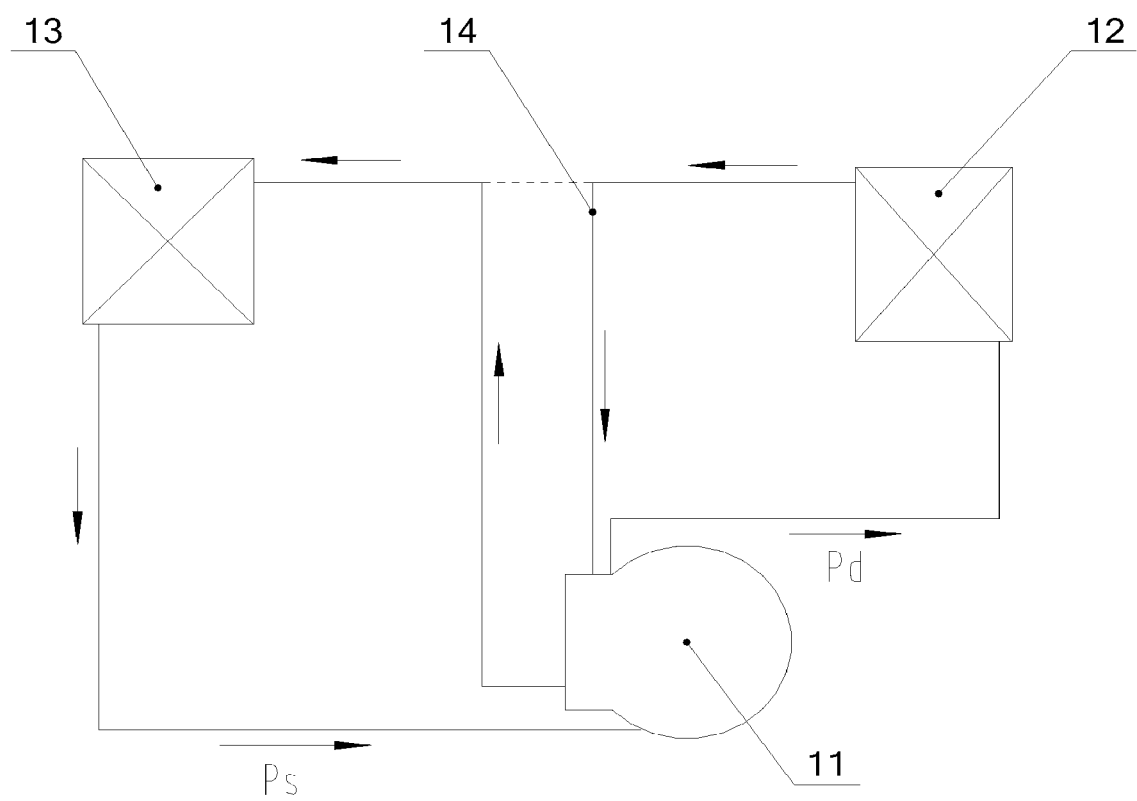
FIG. 2 is a block structure diagram of an enthalpy increasing air conditioning system for an electric vehicle according to an embodiment of the present disclosure.
Figure 3:
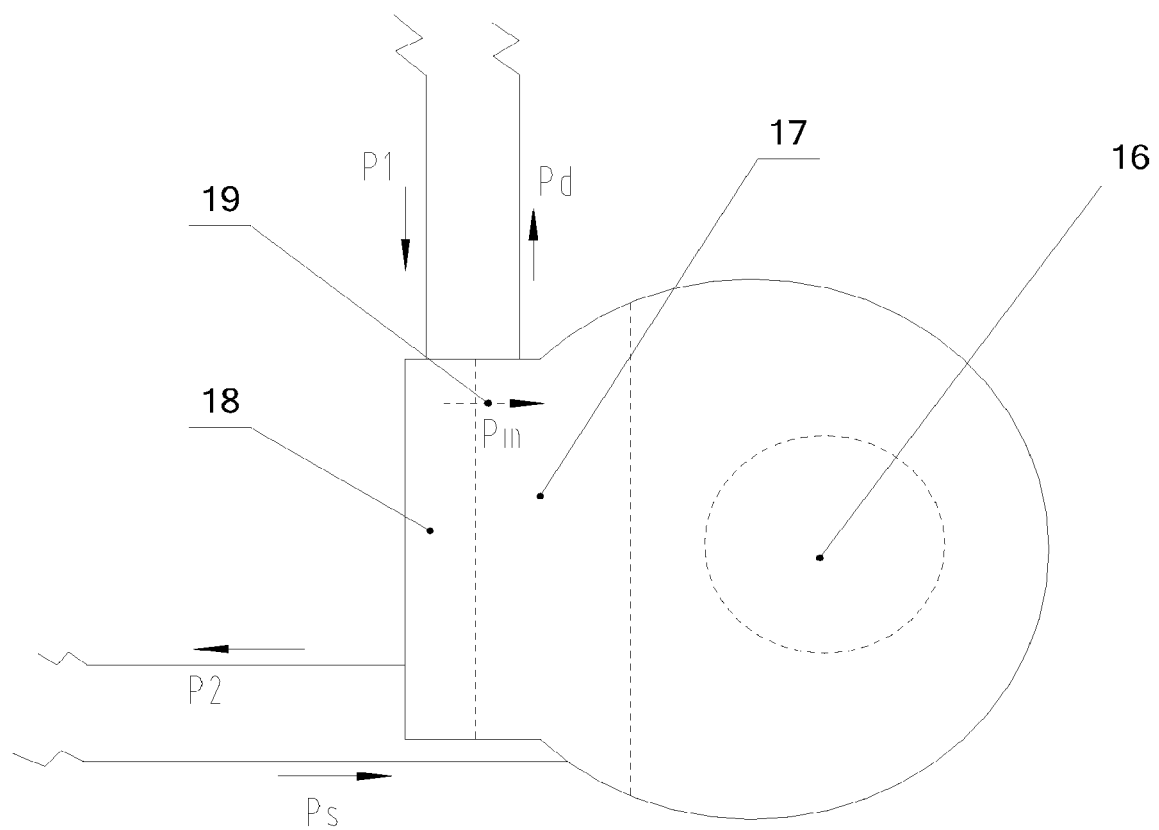
FIG. 3 is a structure diagram of an integrated compressor according to an embodiment of the present disclosure.

REFERENCE SIGNS IN FIG. 2 AND FIG. 3 REPRESENT 11, compressor; 12, condenser; 13, evaporator; 14, system pipeline; 16, drive motor; 17, compression cavity; 18, flash cavity; 19, communicating passage; P1, condenser outlet high-pressure refrigerant; P2, flash cavity cooled refrigerant.

REFERENCE SIGNS IN FIG. 4 TO FIG. 17 REPRESENT 1, first cover; 2, second cover; 3, static scroll plate; 4, dynamic scroll plate; 5, upper bracket; 6, drive motor; 7, drive controller; 8, auxiliary bearing; 9, crankshaft 10, main bearing; 11, tail bearing; 12, fixing assembly bolt; 13, sealing cover plate; 14, O ring; 15, sealing thread plug; 16, fixing bolt; 17, condenser access pipe; 18, refrigerant liquid (condenser effluent); 19, refrigerant liquid (flash cavity effluent); 20, refrigerant gas flowing into the compression cavity; 21, scroll compressor; 22, condenser; 23, evaporator; 31, first end plate; 32, first spiral scroll; 33, communicating passage; 41, second end plate; 42, second spiral scroll; 100, inflow port; 101, third opening; 102, gas-liquid separation structure; 103, first opening; 104, second opening; 105, extending passage; 200, compression cavity; 211, gas-liquid mixed refrigerant; 222, liquid refrigerant; 300, flash cavity; 301, axial passage; 302, radial passage; 303, through hole.

DETAILED DESCRIPTION OF THE EMBODIMENTS

In order to meet the requirement for ultra-low temperature rapid heating of an air conditioning system for an electric vehicle, the present disclosure proposes an enthalpy increasing air conditioning system that is more suitable for an electric vehicle, where the integrated design of a vehicle-mounted electric compressor and an intermediate cooling flash device simplifies the vehicle-mounted enthalpy increasing air conditioning system and improves the reliability of the system.

A clear and complete description will be made to the technical solutions in the embodiments of the present disclosure below in combination with the accompanying drawings in the embodiments of the present disclosure. Apparently, the embodiments described are only part of the embodiments of the present disclosure, not all of them. All other embodiments obtained by those of ordinary skill in the art based on the embodiments of the present disclosure without creative efforts shall fall within the protection scope of the present disclosure.

The air conditioning system provided by the embodiment shown in FIG. 2 and FIG. 3 includes a compressor 11, a condenser 12 and an evaporator 13; the compressor 11 includes a compression cavity 17 for compressing a refrigerant, and the core improvement lies in that:

the compressor 11 further includes a flash cavity 18 capable of flashing a liquid refrigerant, and a communicating passage 19 that communicates a flash cavity gas outlet of the flash cavity 18 and an enthalpy increasing gas supply port of the compression cavity 17;

a flash cavity inlet of the flash cavity 18 communicates with an outlet of the condenser 12, and a flash cavity liquid outlet of the flash cavity 18 communicates with an inlet of the evaporator 13, referring to FIG. 2 and FIG. 3 for the structure thereof.

Working principle: Low-pressure refrigerant gas evaporated from the evaporator 13 is continuously sucked into the compressor 11 for compression. The low-pressure refrigerant gas Ps is compressed into high-temperature and high-pressure refrigerant gas Pd and discharged from the compressor 11 into the condenser 12. The high-temperature and high-pressure refrigerant gas is isobarically cooled in the condenser 12 and then enters the flash cavity 18 of the compressor 11. The liquid refrigerant is flashed within the flash cavity 18. The flashed refrigerant gas directly enters the compression cavity 17 through the communicating passage 19 to achieve an effect of enthalpy increase by cooling on the compression cavity 17. The refrigerant liquid that has not been flashed enters the evaporator 13 for evaporative heat exchange, and the low-pressure refrigerant gas after the evaporative heat exchange is still sucked into the compression cavity 17 of the compressor 11 for compression. Thus, the refrigerant is circulated in the air conditioning system, and the mechanical energy is continuously used for doing work and converted into heat energy.

Based on the above technical solution, the air conditioning system according to the embodiment of the present disclosure has the advantages that the integrated design of the flasher device and the compressor 11 does not need an additional flasher structure in the system, reduces the space and simplifies the air conditioning system; at the same time, the flashed gas can quickly enter the compression cavity 17, thereby reducing the pressure loss and heat transfer temperature rise in the intermediate pipeline, improving the gas supply enthalpy increasing efficiency, and further improving the low-temperature heating performance of the compressor; and the flash structure arranged on the body of the compressor 11 and the compressor 11 are fixedly connected to the vehicle together, thereby achieving better vibration resistance performance than the conventional air conditioning system with a flasher structure, and improving the reliability of the entire vehicle-mounted enthalpy increasing system. This design is particularly suitable for vehicle-mounted enthalpy increasing air conditioning systems.

Preferably, the flash cavity 18 is adjacent to the compression cavity 17, and the two cavities are separated by a common side wall. In this way, the structure of the air conditioning system is further simplified, and the distance between the two cavities is shortened, so that the communicating passage 19 is as short as possible, the pressure loss and heat transfer temperature rise in the intermediate pipeline are reduced, the gas supply enthalpy increasing efficiency is improved, and the low-temperature heating performance of the compressor is further improved.

In a specific embodiment provided by this solution, the communicating passage 19 is arranged on the common side wall.

In order to further optimize the above technical solution, the common side wall is provided with a through hole as the communicating passage 19, and the communicating passage 19 directly communicates with the flash cavity gas outlet and the enthalpy increasing gas supply port of the compression cavity 17, so that the intermediate cooling gas flashed in the flash cavity 18 can directly enter the compression cavity 17, and the enthalpy increasing cooling effect is better.

Preferably, the outer wall of the body of the compressor 11 forms part of the wall of the flash cavity 18. The connection of pipes in the flash cavity 18 is facilitated while the outer wall of the body is fully utilized to simplify the structure. As shown in FIG. 3, the compression cavity 17 is located in the middle, the flash cavity 18 is located on one side thereof, and a drive portion is located on the other side, thus constituting the main body of the compressor 11 with a compact structure.

In order to further optimize the above technical solution, the compressor 11 has an aluminum alloy body. The characteristic of machinability of the aluminum alloy body of the compressor is fully utilized, and the aluminum alloy open structure is more machinable than the conventional steel plate cylinder full-closed structure. The compressor of the aluminum alloy body structure facilitates the integrated design of the external flasher structure on the compressor, and can fully exert the advantage of configuration of the integrated structure.

In a specific embodiment provided by this solution, the compressor 11 is an electric compressor including a drive motor 16 that drives a pump body for compression, the compression cavity 17 is located in the middle, and the flash cavity 18 and the drive motor 16 are respectively located on two sides thereof, so that the structure is compact.

The enthalpy increasing air conditioning system for an electric vehicle according to the present disclosure mainly includes four major components: a compressor 11, a condenser 12, an evaporator 13, and a system pipeline 14. The compressor 11 integrates suction, compression, exhaust and intermediate flash, so that the entire enthalpy increasing system has a compact structure and high reliability. The integrated compressor 11 of the present disclosure includes: a drive motor 16 for driving a pump body for compression, a compression cavity 17 for compressing a refrigerant, a flash cavity 18 capable of flashing a liquid refrigerant, and a communicating passage 19 for communicating the flash cavity and the compression cavity.

The enthalpy increasing air conditioning system in the prior art as shown in FIG. 1 differs from the present disclosure in that a flasher 05 is added between the compressor 01 and the condenser 02, and the refrigerant gas flashed by the flasher 05 passes through an gas supply enthalpy increasing pipeline between a flasher gas outlet a and an enthalpy increasing gas supply port b and then enters the compression cavity of the compressor 01 to achieve enthalpy increasing gas supply.

Compared with the air conditioning system of the prior art, the air conditioning system according to the embodiment of the present disclosure has the following characteristics:

1. Lightweight of Air Conditioning System

The vehicle-mounted air conditioning system is different from a household or commercial air conditioning system, its internal installation space is limited and the system is required to be as light as possible, this requirement is particularly strict for an electric vehicle, and the battery needs to provide power for both the drive motor and the vehicle-mounted air conditioning system. Therefore, the electric vehicle requires a lighter body configuration to improve the endurance. In order to reduce the weight, the compressor for the electric vehicle is of an aluminum alloy open structure, which is more machinable than the conventional steel plate cylinder full-closed structure. The compressor of the aluminum alloy body structure facilitates the integrated design of the external flasher structure on the compressor, and can fully exert the advantage of configuration of the integrated structure. Compared with the existing system, the vehicle-mounted air conditioning system shown in FIG. 2 is more compact due to the absence of a special flasher. Although the flash cavity designed on the compressor enlarges the compressor body, the integrated compressor body is more advantageous in terms of space occupancy than an additional flasher, because the peripheral space of the compressor body can be fully utilized when the flasher cavity is designed, so that the integrated structure is more compact. The conventional flasher device is provided with a special flash tank in the system, and then the flash tank is connected with the compressor, the condenser and the evaporator by a pipeline, while the integrated flash cavity of the present disclosure is arranged on the compressor body, that is, the outer wall of the compressor body serves as a part of the wall of the flash cavity.

2. Short Gas Supply Enthalpy Increasing Passage Provides More Stable Gas Supply Effect, and More Comfortable Indoor Temperature.

When the gas supply enthalpy increasing pipeline that communicates the flasher gas outlet a and the compressor enthalpy increasing gas supply port b as shown in FIG. 1 is arranged in the enthalpy increasing air conditioning system, the length of the gas supply enthalpy increasing pipeline is difficult to serve as a primary consideration due to the influence of the spatial structure. Secondly, the external ambient temperature of the pipeline is affected by the speed of the vehicle. Therefore, after the refrigerant gas flashed from the flasher passes through the gas supply enthalpy increasing pipeline, the gas state attribute changes due to pressure loss and heat transfer, and its enthalpy increasing effect is poorer than that of the refrigerant gas directly entering the compression cavity after being flashed from the flash cavity. The indoor temperature fluctuates due to the instability of the actual operating condition of the compressor, thereby affecting the indoor comfort. At the same time, the reliability of the compressor is also be affected by the fluctuation of the operating condition of the compressor.

3. Good Vibration Resistance of the Enthalpy Increasing System with the Integrated Structure Design Compared with the household or commercial air conditioning system, the vehicle-mounted air conditioning system vibrates violently, so the requirement on the vibration resistance of the vehicle-mounted air conditioning system is high. In the integrated structure design of the flasher structure and the compressor body adopted by the present disclosure, as shown in FIG. 3, the flash cavity 18 is fixed as a part of the compressor to the vehicle body together with the compressor, and therefore has the same vibration characteristic as the compressor. In the existing technical solution shown in FIG. 1, the flasher 05 and the compressor are respectively fixed on the vehicle body, and have different vibration characteristics due to the their structures, so that the gas supply enthalpy increasing pipeline connected between the flasher and the compressor vibrates violently to affect the reliability of the entire system. However, the communicating passage that communicates the flash cavity and the compression cavity according to the embodiment of the present disclosure is directly arranged inside the compressor, where the pipeline does not vibrate. Therefore, the entire enthalpy increasing system has better vibration resistance performance.

FIG. 3 is a structure diagram of an integrated compressor according to an embodiment of the present disclosure. The flash cavity 18 is arranged on the compressor of the aluminum alloy body, the flash cavity 18 directly communicates with the compression cavity 17, and the refrigerant, once flashed, enters the compression cavity 18 to cool it, so the enthalpy increasing cooling effect is better.

An embodiment of the present disclosure also provides a vehicle, including an air conditioning system. As a core improvement, the air conditioning system is the above-described air conditioning system. The vehicle is particularly a new energy vehicle, especially an electric vehicle.

The design is more suitable for an electric vehicle-mounted enthalpy increasing air conditioning system, and the integrated design of the vehicle-mounted electric compressor and the intermediate cooling flash device simplifies the vehicle-mounted enthalpy increasing air conditioning system, improves the reliability of the system, and meets the requirement for ultra-low temperature rapid heating of the air conditioning system for the electric vehicle.

In summary, the embodiment of the present disclosure provides an air conditioning system, including an electric compressor, an evaporator, a condenser, a flasher, and various pipelines connecting the entire system, wherein the flasher structure is integrated with the electric compressor, and the actual main components only include the compressor, the evaporator, the condenser and the various pipelines connecting the entire system. The electric compressor constituting the system includes not only a drive motor and a compression cavity, but also a flash cavity having a flash function. The integrated compressor structure simplifies the entire enthalpy increasing system, saves the space for an additional flasher, and is more suitable for a vehicle-mounted air conditioning system with a limited space.

An embodiment of the present disclosure also provides a vehicle, particularly an electric vehicle, using the above-described air conditioning system.

The technical solutions of some other embodiments provided by the present disclosure are described in detail below with reference to FIG. 4 to FIG. 17.

Figure 4:
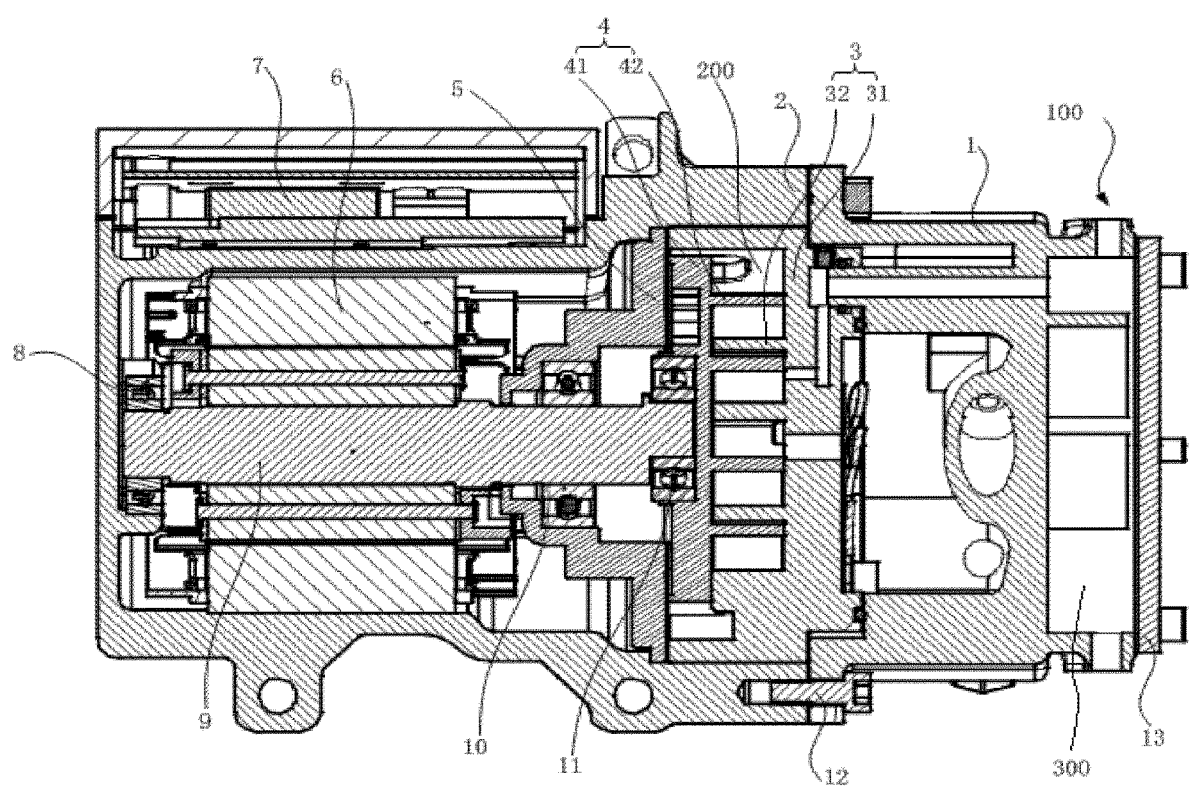
FIG. 4 is a cross-sectional view of a scroll compressor according to an embodiment of the present disclosure.

Referring to FIG. 4, an embodiment of the present disclosure provides a scroll compressor, including a body. The body is provided with an inflow port 100, a compression cavity 200, a discharge port (not shown) and a flash cavity 300. The inflow port 100, the discharge port and the flash cavity 300 are all in communication with the compression cavity 200. The compression cavity 200 is configured to compress a first fluid entering via the inflow port 100. The flash cavity 300 is configured to flash to form a second fluid and deliver it into the compression cavity 200 for compression.

The inflow port 100 serves as a suction port, and the discharge port serves as an exhaust port. The conventional suction, compression and exhaust functions of the scroll compressor are realized by the inflow port 100, the discharge port and the compression cavity 200.

The scroll compressor is provided with two cavities: the compression cavity 200 and the flash cavity 300. The compression cavity 200 is located on a main circulation loop of the air conditioning system, and the flash cavity 300 is used for enthalpy increase by gas replenishment on the compression cavity 200. By In a possible way implementation, the liquid entering the flash cavity 300 is from a condenser 22 of the air conditioning system. By In another possible way implementation, a liquid supply component is separately provided for the flash cavity 300. In this embodiment, the previous way former implementation is described in detail as an example.

The communication positions of the flash cavity 300 and the compression cavity 200 are preferably as follows: the flash cavity 300 communicates with a mobile cavity formed after the scroll compressor sucks gas. That is, the second fluid delivered from the flash cavity 300 to the compression cavity 200 does not participate in the suction process of the scroll compressor, does not serve as part of the sucked gas (i.e., the first fluid), but directly enters the compression cavity 200 and is compressed.

The size of the flash cavity 300 is related to the displacement of the compressor.

According to the above technical solution, the integrated design of the flash cavity 300 of the flasher and the scroll compressor reduces the space occupied by an additional flasher in the air conditioning system, and simplifies the air conditioning system; at the same time, the flashed gas directly enters the compression cavity 200, thereby reducing the pressure loss and heat transfer temperature rise in the intermediate pipeline, improving the gas supply enthalpy increasing efficiency, and further improving the low-temperature heating performance of the compressor. Meanwhile, the flash cavity arranged on the compressor body is fixedly connected to the vehicle together with the compressor, so that better vibration resistance performance is achieved in comparison with the conventional air conditioning system with a flasher, and the reliability of the entire vehicle-mounted enthalpy increasing system is improved.

The flash cavity 300 can be formed by casting or machining, so that various gas-liquid separation structures are arranged inside the flash cavity 300 more conveniently, the phenomenon that the enthalpy increasing gas entrains liquid is effectively reduced, and the reliability of the compressor is improved. The flash cavity arranged on the body can be used for flashing to produce enthalpy increasing gas, and can also be configured on the conventional enthalpy increasing system for gas-liquid separation of the enthalpy increasing gas, thereby expanding the application range of the compressor.

Referring to FIG. 4, the body of the scroll compressor includes a static scroll plate 3, a dynamic scroll plate 4, and a shell. The static scroll plate 3 is provided with a first end plate 31, and a first spiral scroll 32 extending outward from the first end plate 31. The dynamic scroll plate 4 is provided with a second end plate 41, and a second spiral scroll 42 extending outward from the second end plate 41. The first spiral scroll 32 and the second spiral scroll 42 are matched. When the dynamic scroll plate 4 rotates relative to the static scroll plate 3, a plurality of mobile cavities jointly serving as the compression cavity 200 are defined between the first spiral scroll 32 and the second spiral scroll 42. The static scroll plate 3 and the dynamic scroll plate 4 are arranged inside the shell, the flash cavity 300 is arranged in the shell, and/or the flash cavity 300 is arranged on the static scroll plate 3.

In this embodiment, the flash cavity 300 is arranged on the shell as an example, specifically, referring to FIG. 4, the shell includes a first cover 1 and a second cover 2 that are detachably connected. The first cover 1 is located on a side of the static scroll plate 3 where the first spiral scroll 32 is not arranged, and the flash cavity 300 is arranged on the first cover 1.

Figure 7:
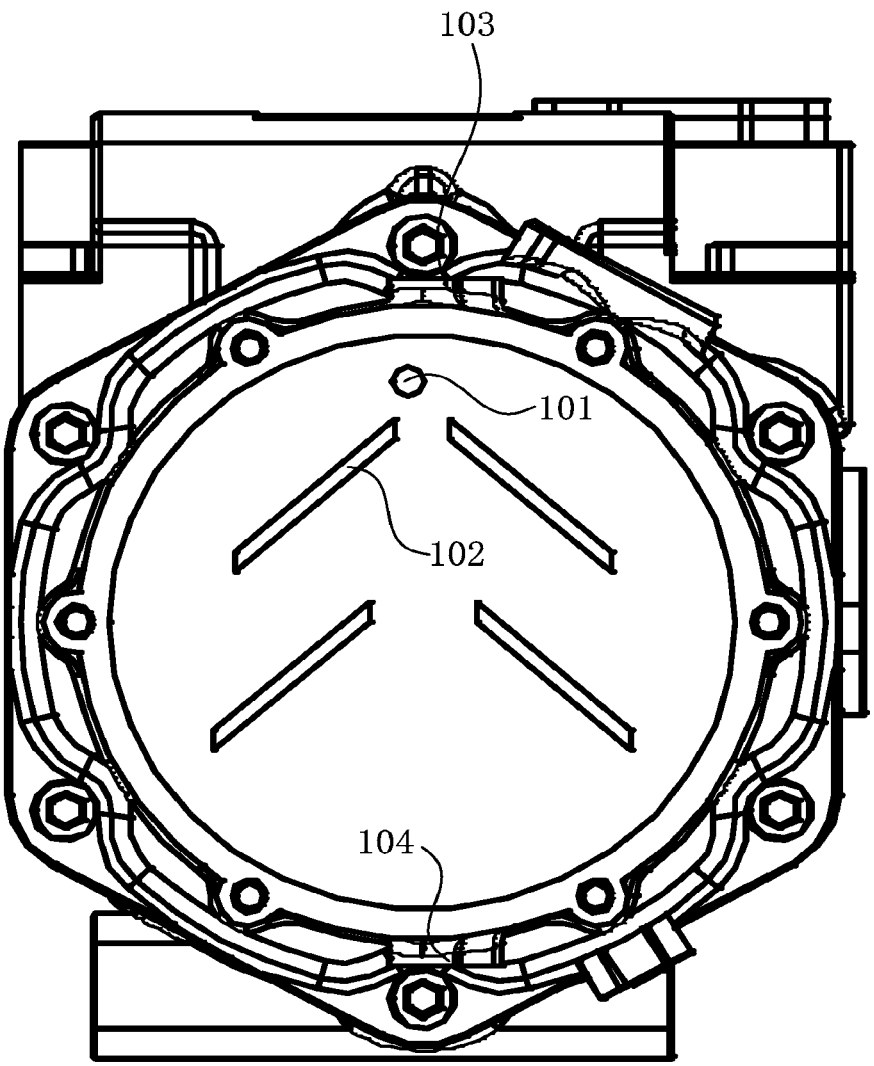
FIG. 7 is a plan view illustrating that a gas-liquid separation structure is arranged on a first cover according to an embodiment of the present disclosure.
Figure 8:
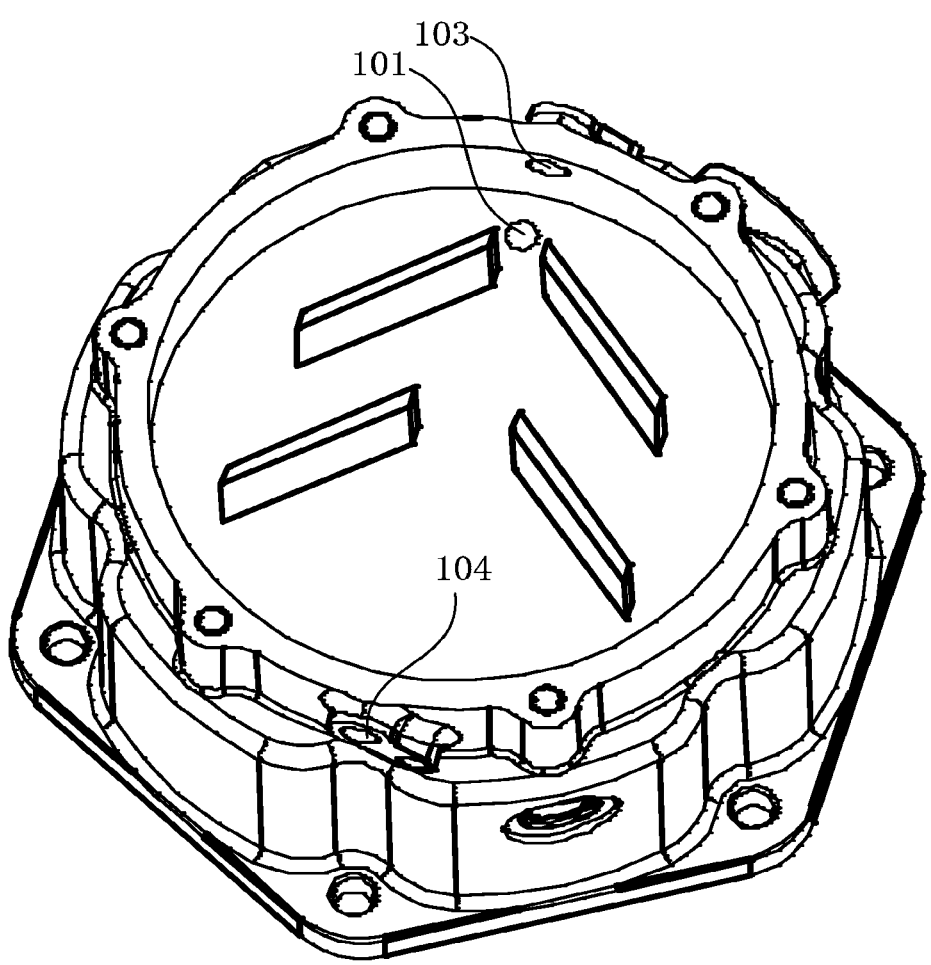
FIG. 8 is a three-dimensional schematic diagram illustrating that the gas-liquid separation structure is arranged on the first cover according to an embodiment of the present disclosure.

In order to ensure that the second fluid entering the compression cavity 200 does not entrain liquid or entrains as little liquid as possible, optionally, referring to FIG. 7 and FIG. 8, a gas-liquid separation structure 102 inclined with respect to the flow direction of the second fluid is arranged in the flash cavity 300, and the gas-liquid separation structure 102 is used for forming a baffling passage to separate the liquid entrained in the second fluid.

After the second fluid entraining the liquid flows through the gas-liquid separation structure 102, the liquid is attached to the gas-liquid separation structure 102 and separated. The separated pure second fluid is delivered to the compression cavity 200 of the scroll compressor for enthalpy increase by gas replenishment.

Based on the above description, the flash cavity 300 can be completely formed inside the first cover 1, and no other opening is formed except the fluid inlet and outlet.

Figure 9:
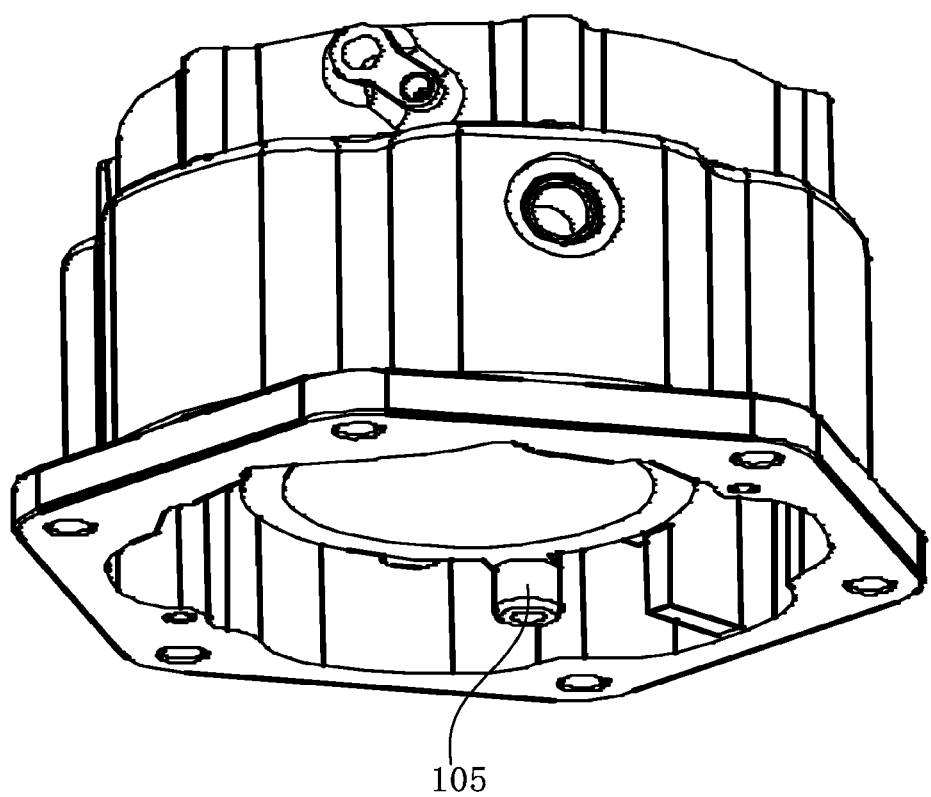
FIG. 9 is a three-dimensional structure diagram of a flash cavity according to an embodiment of the present disclosure.

Alternatively, an open structure is formed on the first cover 1, and the opening is closed by a sealing cover plate 13 and fixing bolts 16, as shown in FIGS. 4 to 9, 11 to 13, and 15. FIG. 8 and FIG. 9 show an embodiment of the flash cavity 300 of the present embodiment. The flash cavity 300 is formed in the axial direction of the first cover 1, and the upper end thereof is of an open structure and is sealed by the sealing cover plate 13 and bolt parts. A third opening 101 (corresponding to the flash cavity gas outlet) and an extending passage 105 thereof are both located inside the first cover 1. The open flash cavity 300 shown in FIG. 8 and FIG. 9 is easiest to implement and can be directly cast through a shell blank, a large flash cavity 300 can be obtained with a small quantity of peripheral materials, and the total weight and size of the shell do not increase much.

Figure 10:
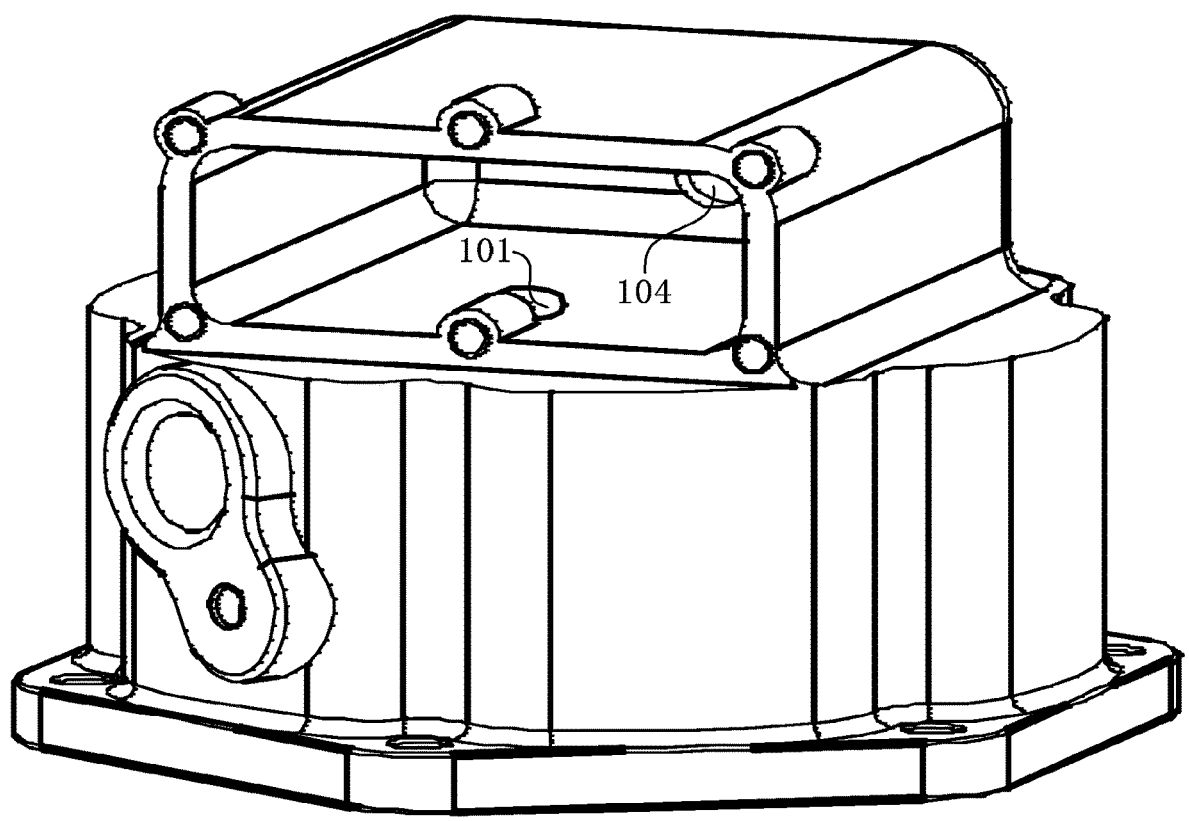
FIG. 10 is another three-dimensional structure diagram of a flash cavity according to an embodiment of the present disclosure.

Alternatively, a part of the flash cavity 300 is formed on the first cover 1, and the other part is formed on the sealing cover plate 13. The first cover 1 and the sealing cover plate 13 jointly form the entire flash cavity 300, as shown in FIG. 10. The opening of another flash cavity 300 according to the embodiment of the present disclosure as shown in FIG. 10 is formed at the top of the first cover 1, and a first opening 103 is arranged on the sealing cover plate 13.

The structure and position of the gas-liquid separation structure 102 are described below.

Figure 17:
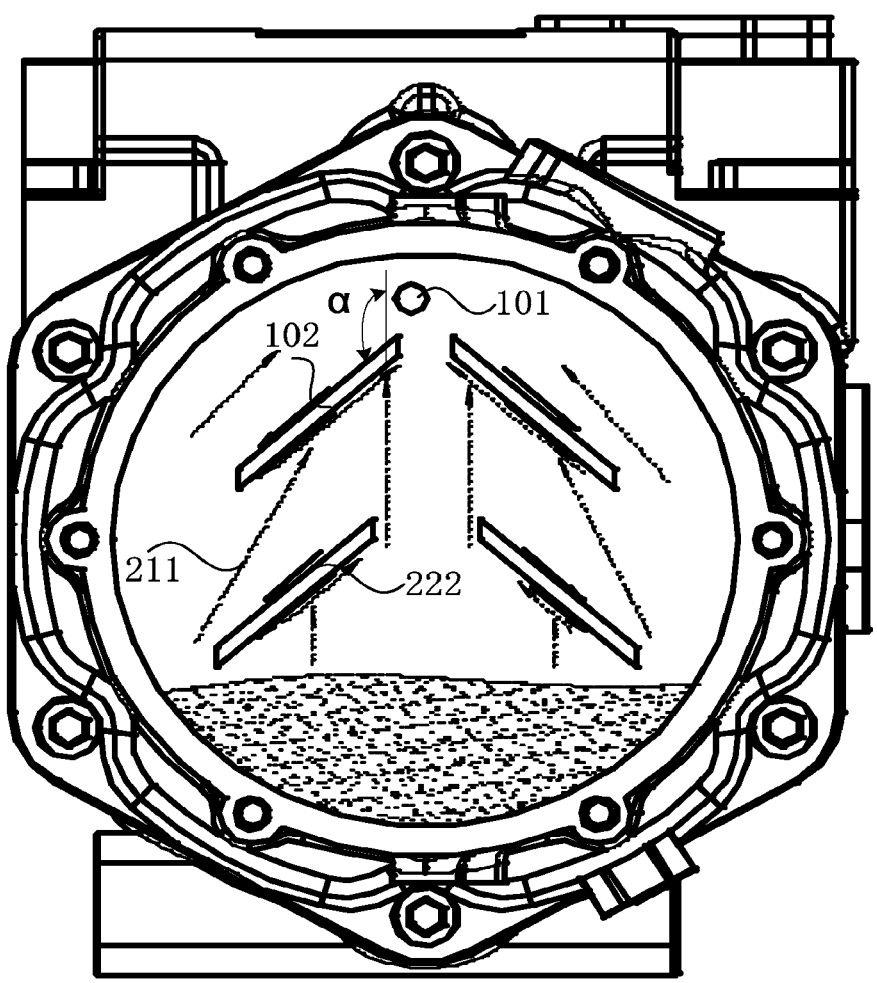
FIG. 17 is a schematic diagram of the flow direction of second fluid in the flash cavity.

In FIG. 7 and FIG. 8, the gas-liquid separation structure 102 includes baffles, and the two baffles are arranged in a splayed shape. The flow direction of the second fluid in the flash cavity 300 is shown in FIG. 17. The arrows indicate the flow direction of the flashed second fluid entraining liquid.

Referring to FIG. 17, the gas-liquid separation structure 102 is at an obtuse or right angle to the flow direction of the second fluid. The gas-liquid separation structure 102 includes baffles, that is, the plane extending direction of the baffles is at an obtuse or right angle to the flow direction of the second fluid, i.e., the angle α is an obtuse or right angle.

Figure 14:
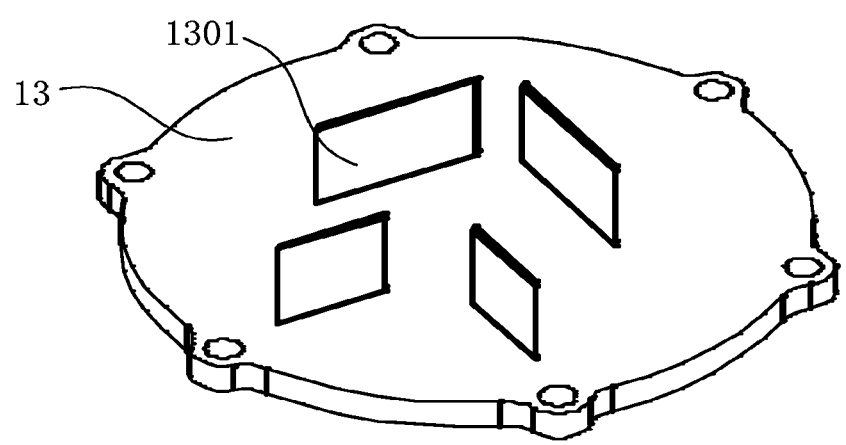
FIG. 14 is a schematic diagram illustrating that the gas-liquid separation structure is arranged on a sealing cover plate according to an embodiment of the present disclosure.

Referring to FIG. 8, the gas-liquid separation structure 102 may be entirely arranged on the first cover 1; or, referring to FIG. 14, the gas-liquid separation structure 102 may be entirely arranged on the sealing cover plate 13. Alternatively, as shown in FIG. 16, the baffles may also be staggered on the first cover 1 and the sealing cover plate.

Figure 15:
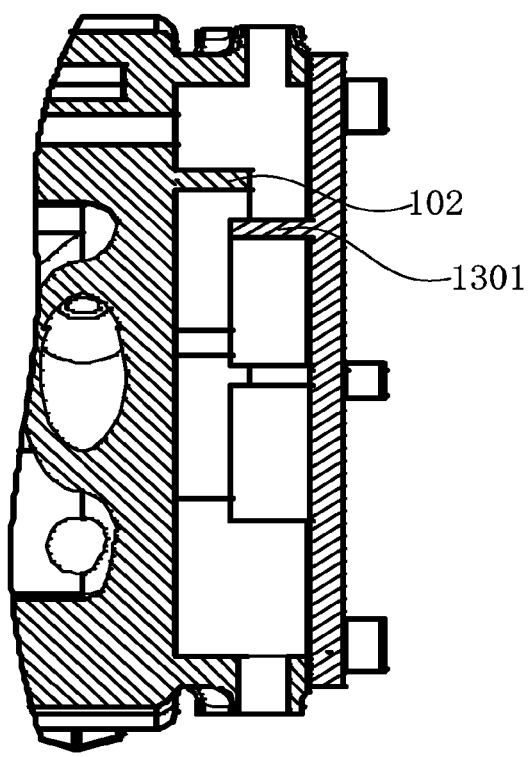
FIG. 15 is a cross-sectional view of the gas-liquid separation structure according to an embodiment of the present disclosure.
Figure 16:
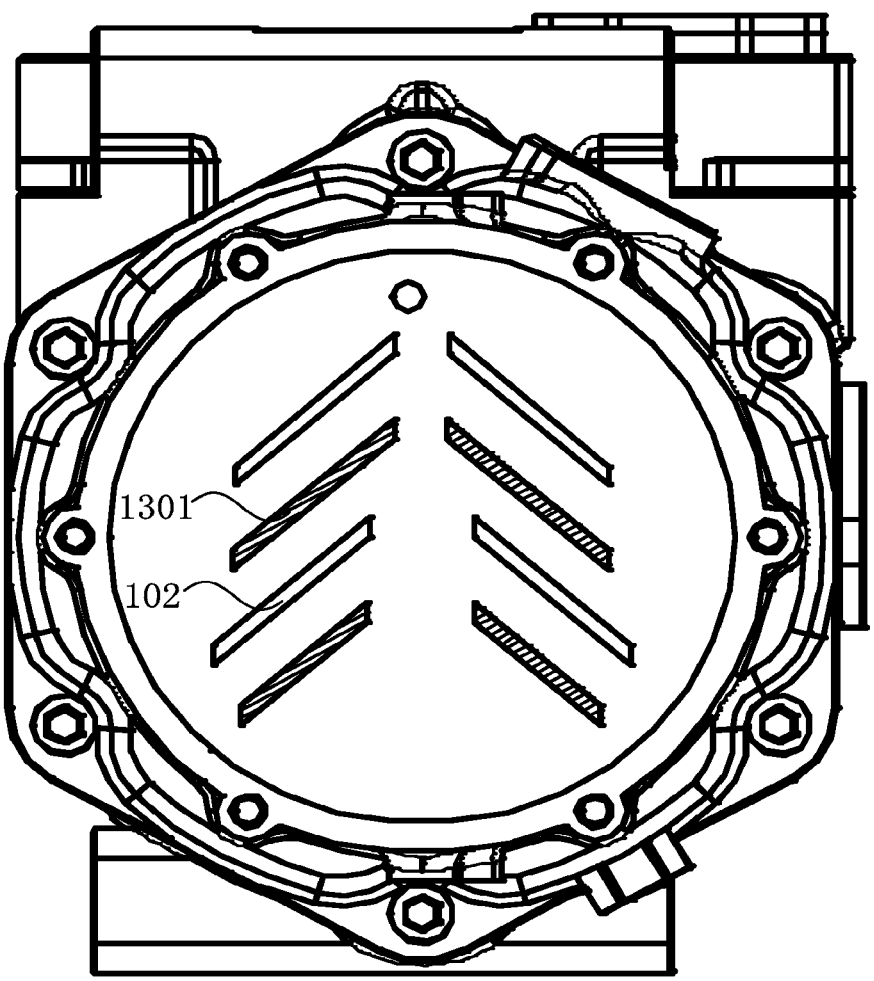
FIG. 16 is a schematic diagram illustrating that the gas-liquid separation structure is simultaneously arranged on the first cover and the sealing cover plate according to an embodiment of the present disclosure.

Referring to FIG. 9 and FIG. 16, the shell includes a first cover 1, a second cover 2 and a sealing cover plate 13 that are detachably connected. The first cover 1 is located on a side of the static scroll plate 3 where the first spiral scroll 32 is not arranged, and the sealing cover plate 13 is arranged on a side of the first cover 1 away from the second cover 2. A part of the flash cavity 300 is arranged on the first cover 1, and the other part of the flash cavity 300 is arranged on the sealing cover plate 13. The baffles staggered on the first cover 1 and the sealing cover plate form a baffling space as shown in FIG. 15 in the flash cavity, so that the gas-liquid separation effect is better. The better effect is achieved by a plurality of baffles. Such separate arrangement can increase the number of baffling cavities, and reduces the baffling resistance compared to the arrangement of the baffles on only one structural member. Moreover, if the baffles are arranged on only one structural member, the close baffles increase the machining difficulty.

The communication relationship between the flash cavity 300 and the compression cavity 200 is described below.

Figure 5:
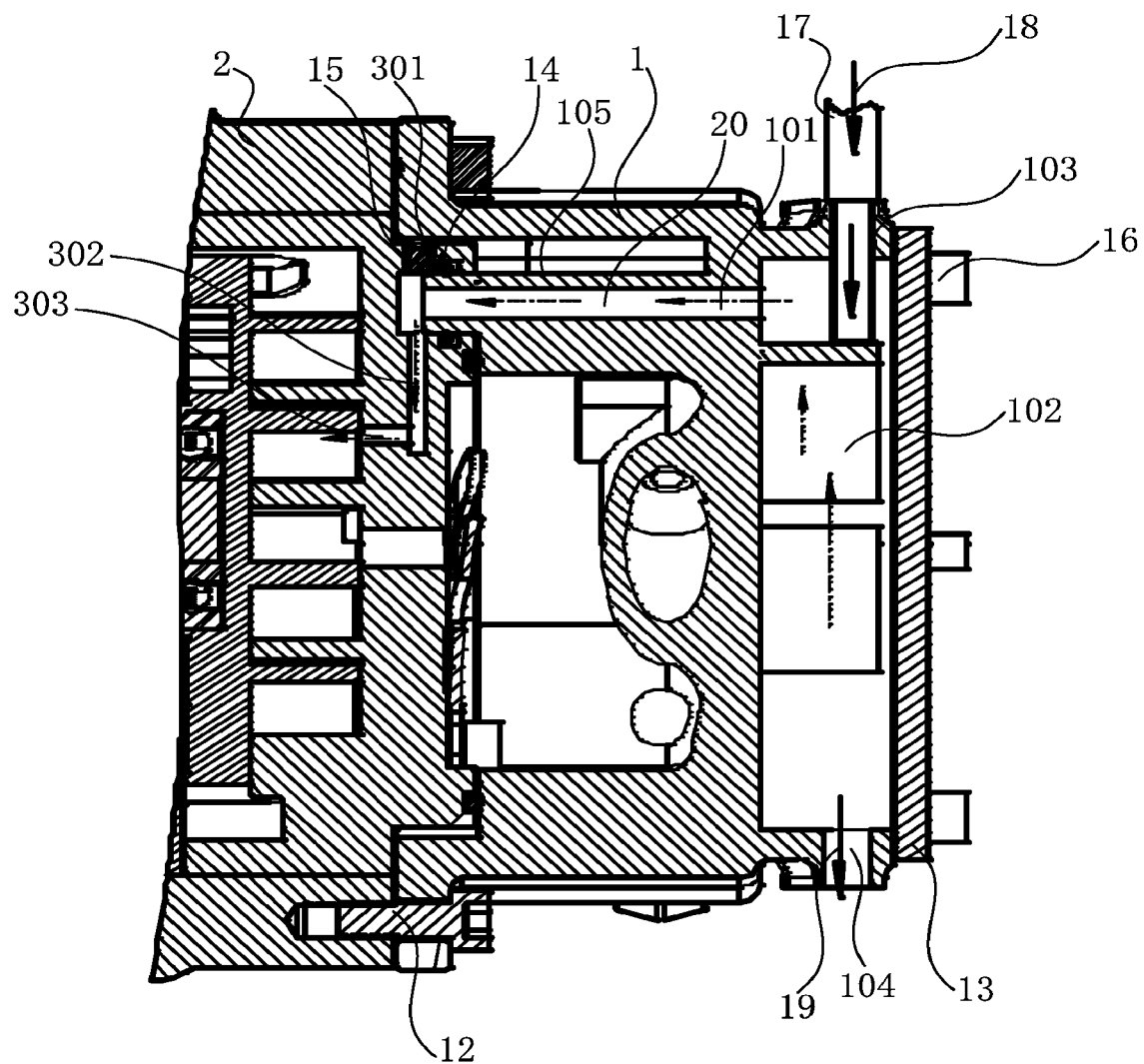
FIG. 5 is a partial cross-sectional view of the scroll compressor according to an embodiment of the present disclosure.

Referring to FIG. 5, the compression cavity 200 is provided with a through hole 303 (corresponding to an enthalpy increasing gas supply port) communicating with the flash cavity 300. A crankshaft 9 drives the dynamic scroll plate 4 to rotate relative to the static scroll plate 3. During rotation, every time it rotates a circle, the compression cavity 200 communicates with the flash cavity 300 once, and this communication occurs periodically, or intermittently.

Referring to FIG. 7, a first opening 103 (corresponding to the flash cavity inlet) of the flash cavity 300 for introducing a fluid to be flashed is arranged at the top end of the flash cavity 300, a second opening 104 (corresponding to the flash cavity liquid outlet) of flash cavity 300 for discharging the liquid that is not flashed is arranged at the bottom end of the flash cavity 300, and a third opening 101 of the flash cavity 300 for discharging the flashed second fluid is arranged at the top end of the flash cavity 300. The gas obtained by flash is the second fluid. The third opening 101 of the flash cavity 300 is in communication with the compression cavity 200.

The fluid to be flashed is liquid, the first opening 103 is arranged at the top end of the flash cavity 300, and in the process that the fluid to be flashed flows from the top of the flash cavity 300 to the bottom of the flash cavity 300, in addition to flashing, certain gas-liquid separation can be realized due to different gravities of gas and liquid. The remaining liquid after flashing gathers at the bottom of the flash cavity 300 and then is discharged via the second opening 104 at the bottom of the flash cavity 300. The flashed second fluid is gas, and the gas gathers at the upper part of the flash cavity 300 and is then discharged into the compression cavity 200 via the third opening 101 at the top of the flash cavity 300.

Specifically, referring to FIG. 4 and FIG. 5, a communicating passage 33 is further arranged in the first end plate 31 of the static scroll plate 3, and the communicating passage 33 communicates the flash cavity 300 with the through hole 303 of the compression cavity 200.

Figure 11:
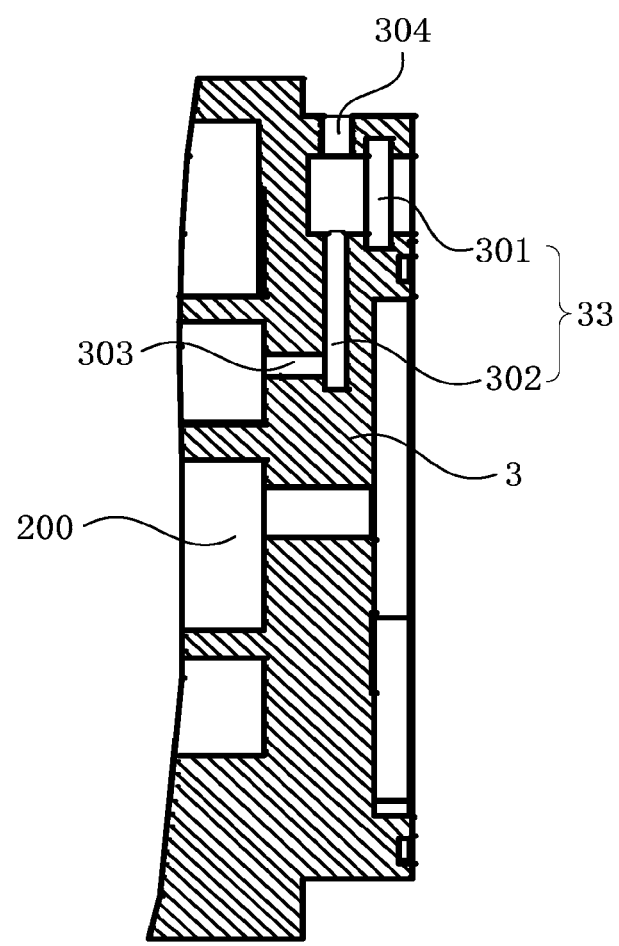
FIG. 11 is a structure diagram of a static scroll plate communicating passage according to an embodiment of the present disclosure.

Referring to FIG. 11, in an optional mode, the communicating passage 33 includes an axial passage 301 and a radial passage 302 communicating with each other, one end of the axial passage 301 away from the radial passage 302 communicates with the flash cavity 300, and one end of the radial passage 302 away from the axial passage 301 communicates with the compression cavity 200.

Figure 12:
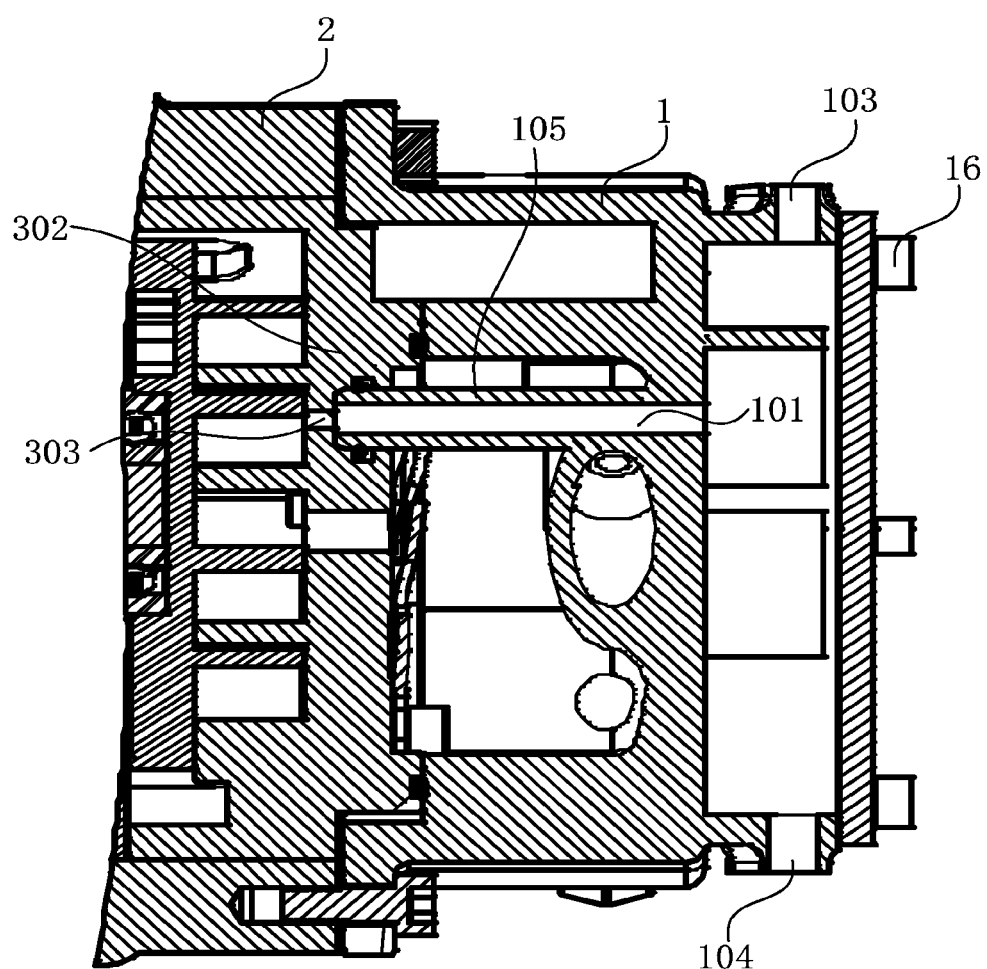
FIG. 12 is an installation diagram of the communicating passage shown in FIG. 11.
Figure 13:
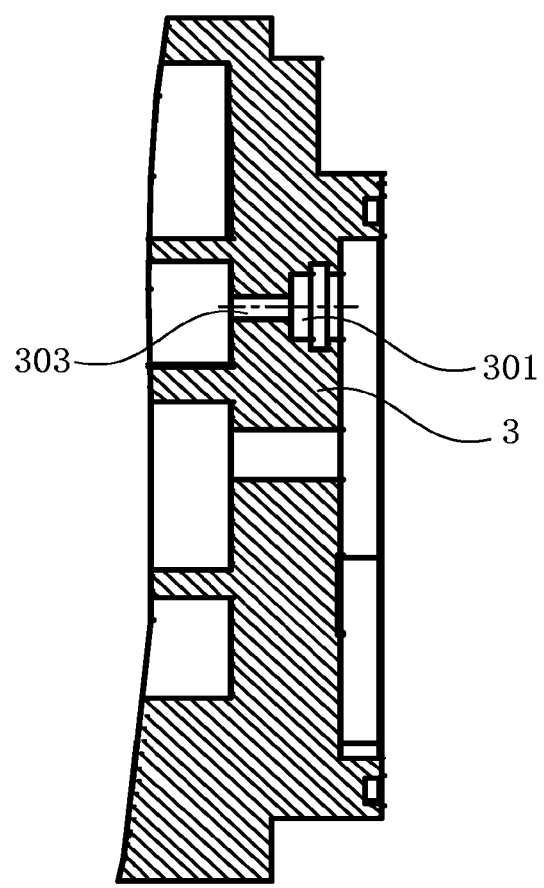
FIG. 13 is another structure diagram of a static scroll plate communicating passage according to an embodiment of the present disclosure.

Referring to FIG. 12, in another optional mode, the extending passage 105 of the third opening 101 directly corresponds to the through hole 303 at a specified position in the compression cavity, and the flashed gas in the flash cavity 300 directly enters the compression cavity 200 through the third opening 101. FIG. 13 shows a structure of the static scroll plate 3 of the present embodiment. Compared with the structure of the static scroll plate 3 shown in FIG. 11, the radial passage 302 and the sealing thread plug 15 are omitted in the static scroll plate 3 of the present embodiment, thereby achieving the advantages of simple structure and convenient machining of the static scroll plate 3. Of course, since the third opening 101 corresponds to the through hole 303 at the specified position in the compression cavity 200 on the static scroll plate 3, the position in the flash cavity 300 of the third opening 101 also changes under the influence of the position of the through hole 303.

An example is described below with reference to the accompanying drawings.

The scroll compressor provided by the embodiment of the present disclosure has the same suction-compression-exhaust process as the conventional scroll compressor. The dynamic scroll plate 4 is supported by an upper bracket 5, the crankshaft 9 drives the dynamic scroll plate 4 to rotate under the drive of the drive motor 6, the compression cavity 200 varying periodically is formed between the dynamic scroll plate 4 and the static scroll plate 3, and the refrigerant gas is subjected to the process of suction, compression and exhaust in the compression cavity 200. The drive controller 7 controls the rotational speed of the drive motor 6. An auxiliary bearing 8, a main bearing 10 and a tail bearing 11 jointly support the crankshaft 9. The first cover 1 is in connection with the second cover 2 by fixing assembly bolts 12. In FIG. 5, the dotted lines indicate the flow state of the refrigerant gas (the second fluid) flashed in the flash cavity.

In the present embodiment, the scroll compressor is arranged in the air conditioning system as an example. As shown in FIG. 5, the first cover 1 of the scroll compressor according to the embodiment of the present disclosure has an additional flash cavity structure, i.e., the flash cavity 300. The flash cavity 300 has three openings, the three openings are respectively a first opening 103 connected to the outlet of the condenser 22, a second opening 104 connected to the inlet of the evaporator 23, and a third opening 101 connected to the enthalpy increasing gas supply port of the compression cavity 200, and baffles are obliquely arranged in the flash cavity 300.

The liquid refrigerant coming out of the condenser 22 is flashed in the flash cavity 300, the liquid refrigerant that has not been flashed continues to flow to the evaporator 23 through the second opening 104, the flashed and cooled refrigerant gas enters the compression cavity 200 through the third opening 101, and the liquid refrigerant is subjected to the process of flashing, cooling and enthalpy increasing in the flash cavity 300.

The static scroll plate 3 has a communicating passage 33 hermetically connected to the third opening 101 of the flash cavity 300, the communicating passage 33 is formed in the first end plate 31 of the static scroll plate 3, one end of the communicating passage 33 is connected to the third opening 101, and the other end is connected to the through hole 303 at the specified position of the compression cavity 200 to introduce the refrigerant in the flash cavity 300 into the compression cavity 200 within a certain specified range of the compressor crankshaft angle.

Referring to FIG. 11, the communication position of the third opening 101 of the flash cavity 300 and the static scroll plate 3 may be arranged at a position of the static scroll plate 3 near the periphery, and the first end plate 31 of the static scroll plate 3 is provided with an axial passage 301 and a radial passage 302 for communicating the flash cavity 300 and the compression cavity 200. This structure is applicable to various embodiments.

Referring to FIG. 13, the connection position of the third opening 101 and the static scroll plate 3 can also be directly arranged at a specified position of the compression cavity 200, and only the axial passage 301 is formed in the first end plate 31 of the static scroll plate 3. This structure is applicable to various embodiments.

Figure 6:
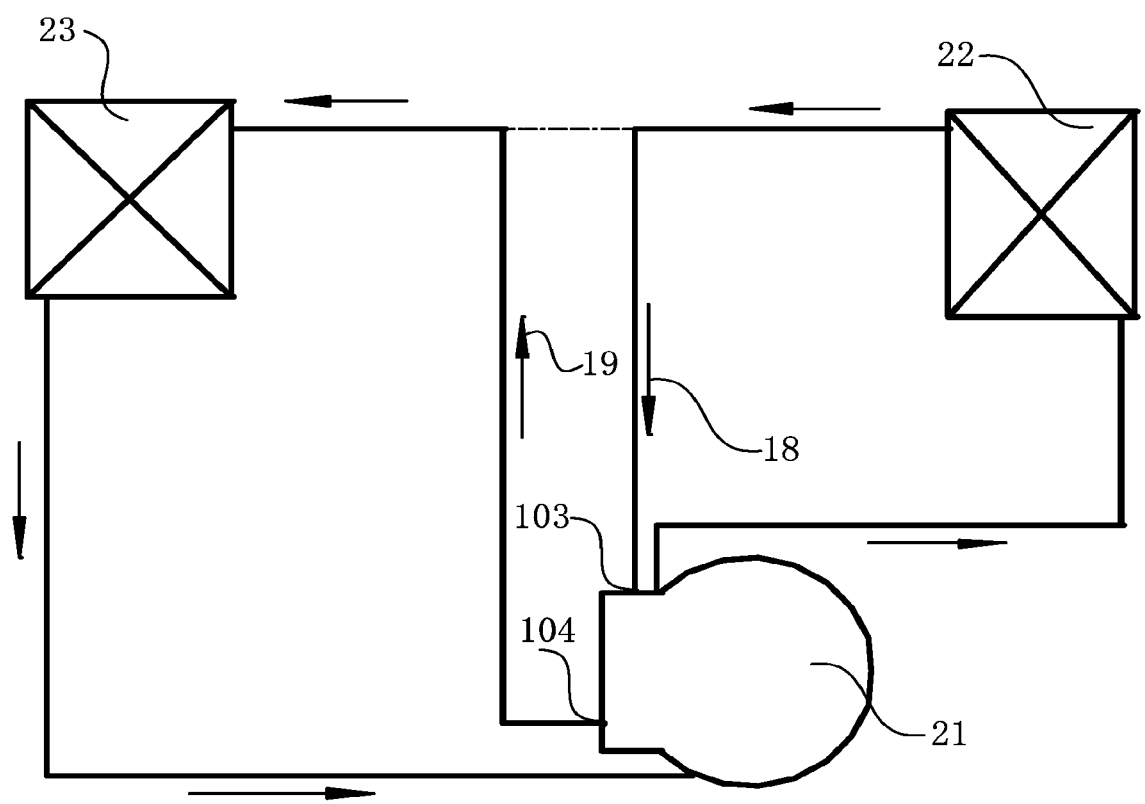
FIG. 6 is a pipe arrangement diagram of the scroll compressor according to an embodiment of the present disclosure.

Referring to FIG. 6, the high-temperature and high-pressure refrigerant liquid 18 coming out of the condenser 22 enters the flash cavity 300 of the compressor 21 through the first opening 103. As shown in FIG. 4, after the high-temperature and high-pressure refrigerant liquid enters the flash cavity 300, the pressure is reduced because the volumetric space suddenly becomes large. The flash cavity is the same as a separate flash structure, where the refrigerant liquid enters the space that suddenly becomes large, part of the liquid is rapidly flashed into low-temperature gas, and the high-temperature refrigerant liquid that has not been flashed is cooled into low-temperature liquid due to flashing heat absorption. The solid arrows in FIG. 5 indicate the flow path of the refrigerant liquid in the flash cavity 300 of the first cover 1. The flashed low-temperature refrigerant gas flows as indicated by the dotted arrows in FIG. 5, and the flashed low-temperature refrigerant gas flows out through the third opening 101 and enters the communicating passage 33 in the static scroll plate 3.

In FIG. 5, the extending passage 105 of the third opening 101 corresponds to a relatively peripheral position on the static scroll plate 3, an axial passage 301 is formed corresponding to the relatively peripheral position of the static scroll plate 3, and an O ring 14 sealing the extending passage 105 of the third opening 101 is arranged on the axial passage 301 to achieve a sealing effect between the two. A radial passage 302 is also formed in the first end plate 31 of the static scroll plate 3 to communicate the axial passage 301 and the through hole 303 of the compression cavity 200. The radial passage 302 is sealed by a sealing thread plug 15. Then, the refrigerant gas flowing out of the third opening 101 can enter the compression cavity 200 through the sealed communicating passage, thereby achieving enthalpy increasing gas supply for the compression cavity 200.

The flashing, cooling and enthalpy increasing process according to the embodiment of the present disclosure is achieved only by the flash cavity 300 and the communicating passage 33, so that the intermediate pipeline and structural arrangement are omitted. As shown in FIG. 6, the refrigerant liquid 19 cooled in the flash cavity 300 flows out of the second opening 104 and then directly enters the evaporator 23. Such system arrangement helps to simplify the structure of the enthalpy increasing system, and is more suitable for the vehicle-mounted air conditioning system having strict requirements for installation space and installation weight.

In FIG. 6, the dotted line indicates the system pipeline. When the compressor is not supplied with gas to increase the enthalpy, the refrigerant liquid coming from the condenser 22 of the system flows to the subsequent structure through the pipeline.

As shown in FIG. 7, the third opening 101 for introducing fluid into the compression cavity 200 is arranged at the top end of the flash cavity 300, the second opening 104 for discharging liquid into the evaporator 23 is arranged at the bottom end of the flash cavity 300, and baffles inclined with respect to the flow direction of the second fluid are arranged in the flash cavity 300 to divide the flow path of the refrigerant into baffling paths, thereby facilitating the gas-liquid separation of the refrigerant, and ensuring that the refrigerant entering the compression cavity 200 entrains little liquid.

As shown in FIG. 17, in the flash cavity 300, the actual fluid state is a gas-liquid mixed state of the refrigerant liquid that has not been flashed and the refrigerant vapor. In FIG. 17, when the gas-liquid mixed state refrigerant 211 flows to the third opening 101, gas-liquid separation is implemented by the baffles (the baffles are solid flat plates or perforated plates). The baffles are inclined at certain angles to the flow direction of the refrigerant. The dotted arrows in FIG. 17 indicate the flow direction of the gas-liquid mixed state refrigerant 211. When the gas-liquid mixed state refrigerant 211 touches the baffles, the liquid refrigerant 222 is mostly attached to the walls of the baffles under the action of surface tension, the gas-liquid mixed state refrigerant 211 is subjected to gas-liquid separation. In FIG. 17, the solid arrows indicate the flow direction of the separated liquid refrigerant 222 on the baffles. Based on the above description, baffles are arranged in the flash cavity 300 to effectively implement gas-liquid separation on the gas-liquid mixed state refrigerant 211 flashed in the flash cavity 300, thereby preventing gas entraining liquid from supplying to the compression cavity 200, and improving the reliability of the compressor.

As shown in FIG. 11, the axial passage 301 and the radial passage 302 are separately formed in the static scroll plate 3. The through hole 303 at the specified position of the compression cavity 200 and the tail end of the radial passage 302 are provided with internal threads 304. The size of the through hole 303 is greater than, equal to or smaller than the wall thickness of scroll teeth of the spiral scrolls, depending on the requirement of gas supply to the compression cavity 200. If the compression cavity 200 needs to be moved inward and outward to alternately supply gas, the size of the through hole is smaller than the wall thickness of the scroll teeth, but should be as large as possible. If the compression cavity 200 is moved inward and outward to simultaneously supply gas, the size of the through hole 303 is greater than the wall thickness of the scroll teeth, but should not be too large, and should meet the sealing requirement of the compression cavity 200. The through hole 303 is set as close as possible to the position where suction of the compression cavity 200 is closed, depending on the suction of the compression cavity 200 moved inward and outward.

Another embodiment of the present disclosure provides an air conditioning system, including the scroll compressor 21 provided by any technical solution of the present disclosure.

A fluid supply component may be separately provided to supply fluid to the flash cavity 300. That is, the air conditioning system further includes a fluid supply component that communicates with the flash cavity 300 of the scroll compressor 21, and the flash cavity 300 is configured to flash the fluid supplied by the fluid supply component to form the second fluid.

Alternatively, the liquid in the air conditioning system is supplied to the flash cavity 300. Specifically, the first opening 103 of the flash cavity 300 communicates with the outlet of the condenser 22, and a condenser access pipe 17 communicates the condenser 22 to the first opening 103. The second opening 104 of the flash cavity 300 communicates with the inlet of the evaporator 23, and the third opening 101 of the flash cavity 300 communicates with the compression cavity 200 of the scroll compressor.

A further embodiment of the present disclosure provides a new energy vehicle, including the air conditioning system provided by any technical solution of the present disclosure.

The embodiments in this specification are all described in a progressive manner. The description of each of the embodiments focuses on differences from other embodiments, and reference may be made to each other for the same or similar parts among respective embodiments.

The above descriptions of the disclosed embodiments enable those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not to be limited to these embodiments described herein, but conforms to the widest scope consistent with the principle and novelty disclosed herein.

The invention claimed is:

1. A compressor, comprising:
   a compression cavity having an enthalpy increasing gas supply port;
   a flash cavity for flashing a liquid refrigerant, having a flash cavity inlet for communicating with an outlet of a condenser, a flash cavity gas outlet, and a flash cavity liquid outlet for communicating with an inlet of an evaporator; and
   a communicating passage communicating with the flash cavity gas outlet of the flash cavity and the enthalpy increasing gas supply port of the compression cavity.

2. The compressor according to claim 1, wherein the flash cavity is adjacent to the compression cavity, and the flash cavity and the compression cavity are separated by a common side wall.

3. The compressor according to claim 2, wherein the communicating passage is arranged on the common side wall.

4. The compressor according to claim 1, wherein the outer wall of the body of the compressor forms a part of the wall of the flash cavity.

5. The compressor according to claim 1, wherein the compressor is an electric compressor, and the flash cavity and a drive motor of the compressor are arranged on two sides of the compression cavity respectively.

6. The compressor according to claim 1, wherein the compressor is a scroll compressor having a body, and the body is provided with an inflow port, the compression cavity, a discharge port and the flash cavity; the inflow port, the discharge port and the flash cavity communicate with the compression cavity; wherein the compression cavity is configured to compress a first fluid entering via the inflow port; and the flash cavity is configured to produce a second fluid by flashing and deliver the second fluid to the compression cavity for compression.

7. The compressor according to claim 6, wherein the body comprises a static scroll plate, a dynamic scroll plate and a shell, the static scroll plate is provided with a first end plate and a first spiral scroll extending outward from the first end plate, and the dynamic scroll plate is provided with a second end plate and a second spiral scroll extending outward from the second end plate; the first spiral scroll and the second spiral scroll are matched, and when the dynamic scroll plate rotates relative to the static scroll plate, a plurality of mobile cavities being the compression cavity are defined between the first spiral scroll and the second spiral scroll; the static scroll plate and the dynamic scroll plate are arranged inside the shell, and the flash cavity is arranged on at least one of the shell and the static scroll plate.

8. The compressor according to claim 7, wherein the shell comprises a first cover and a second cover that are detachably connected, the first cover is located on a side of the static scroll plate where the first spiral scroll is not arranged, and the flash cavity is arranged on the first cover.

9. The compressor according to claim 7, wherein the shell comprises a first cover, a second cover and a sealing cover plate that are detachably connected, the first cover is located on a side of the static scroll plate where the first spiral scroll is not arranged, and the sealing cover plate is arranged on a side of the first cover away from the second cover;
   a part of the flash cavity is arranged on the first cover, and the other part of the flash cavity is arranged on the sealing cover plate; or, the flash cavity is arranged on the first cover and has an opening, and the sealing cover plate closes the opening of the flash cavity.

10. The compressor according to claim 6, wherein a gas-liquid separation structure inclined with respect to the flow direction of the second fluid is arranged in the flash cavity to separate the liquid entrained in the second fluid.

11. The compressor according to claim 10, wherein the gas-liquid separation structure comprises baffle, and the extending direction of the baffle is at an obtuse or right angle to the flow direction of the second fluid.

12. The compressor according to claim 11, wherein the gas-liquid separation structure comprises at least two baffles, and the two baffles are arranged in a splayed shape.

13. The compressor according to claim 10, wherein the gas-liquid separation structure comprises two groups of baffles staggered to form a split-flow passage.

14. The compressor according to claim 7, wherein the communicating passage is arranged in the first end plate of the static scroll plate, and the flash cavity is communicated with the compression cavity by the communicating passage.

15. The compressor according to claim 6, wherein the compression cavity is provided with an axial through hole communicating with the flash cavity to form the enthalpy increasing gas supply port.

16. The compressor according to claim 15, wherein a first opening of the flash cavity being the flash cavity inlet is arranged at the top end of the flash cavity to introduce a fluid to be flashed, a second opening of the flash cavity being the flash cavity liquid outlet is arranged at the bottom end of the flash cavity to discharge the liquid that is not flashed, and a third opening of the flash cavity being the flash cavity gas outlet is arranged at the top end of the flash cavity to discharge the flashed second fluid; and the third opening of the flash cavity communicates with the compression cavity.

17. An air conditioning system, comprising a compressor according to claim 1, a condenser and an evaporator, the flash cavity inlet communicating to the outlet of the condenser, and the flash cavity liquid outlet communicating to the inlet of the evaporator.

18. The air conditioning system according to claim 17, further comprising a fluid supply component in communication with the flash cavity, wherein the flash cavity is configured to flash a fluid supplied by the fluid supply component to produce a second fluid.

19. A vehicle, comprising an air conditioning system according to claim 17.

20. The vehicle according to claim 19, wherein the vehicle is a new energy vehicle.

* * * * *